United States Patent [19]

Emory, Sr. et al.

[11] 3,778,918

[45] Dec. 18, 1973

[54] DOWNRIGGER RELEASE FOR FISHING

[75] Inventors: John E. Emory, Sr.; John E. Emory, Jr., both of Traverse City, Mich.

[73] Assignee: Big Jon, Inc., Traverse City, Mich.

[22] Filed: Jan. 7, 1972

[21] Appl. No.: 216,170

[52] U.S. Cl. ............................................. 43/43.12
[51] Int. Cl. ............................................ A01k 91/00
[58] Field of Search .................. 43/43.12, 4, 42.09, 43/42.39, 42.37, 42.49, 43.14, 44.81, 44.88, 42.72, 42.04, 27.2, 43.12, 43.11, 44.84; 213/8; 24/85, 217, 201; 151/14

[56] References Cited
UNITED STATES PATENTS

| | | | |
|---|---|---|---|
| 3,569,370 | 5/1972 | Ritter | 43/43.12 |
| 3,500,576 | 3/1970 | Ostrom | 43/43.12 |
| 2,957,267 | 10/1960 | Dempsey | 43/44.88 |
| 3,628,274 | 12/1971 | Wojahn | 43/43.12 |
| 2,908,989 | 10/1959 | Povinelli et al. | 43/42.74 |

Primary Examiner—Louis G. Mancene
Assistant Examiner—Gregory E. McNeill
Attorney—Price et al.

[57] ABSTRACT

A downrigger release mechanism for releasably securing a fishing tackle line to a separate downrigger or outrigger line. The mechanism comprises a cylindrical release member including one of two types of means for securing it to the downrigger line. One means fixedly secures the release member to the downrigger line and weight. The other slidably secures the release member to the downrigger line such that the position of the release member on the downrigger line can be controlled by the amount of tackle line released. Further, in this latter embodiment the addition of other release members to the downrigger line is made possible, thereby allowing several fish to be caught without raising the downrigger line and/or release members. The mechanism utilizes two alternative removable release clip means directly securable to a release means formed integrally in the release member for releasably securing the tackle line to the release member.

20 Claims, 8 Drawing Figures

PATENTED DEC 18 1973

PATENTED DEC 18 1973

DOWNRIGGER RELEASE FOR FISHING

This invention relates to downrigger release devices for fishing and, more particularly, to devices for releasably attaching a fishing tackle line to a downrigger or outrigger line, maintaining the tackle line at a certain depth while trolling, and releasing the tackle line from the downrigger line when a fish strikes.

BACKGROUND OF THE INVENTION

In the past, release devices for use with a downrigger or outrigger line, which carries the tackle line and attached hook or lure to the proper depth and maintains the line at that depth while trolling until a fish strikes, have been bulky and often have included many moving parts operable for the release of the tackle line from the downrigger line. The bulky release devices are unmanageable and difficult to use and often are too large to be conveniently stored in a tackle box between or even during fishing trips. Similarly, many previous release devices included many moving parts making them susceptible to breakdowns, corrosion, and the loss of such moving parts through vibration, etc, all of which prevented their proper and timely release of the tackle lines at the time when a fish strikes. Additionally, when such previous release devices are used, it is necessary after each strike or catch to reel in the downrigger or outrigger line and attach another release device in order to reattach the tackle line for subsequent let down to the proper depth for fishing. It is apparent that, especially when fish are biting and being caught rapidly, such reeling and unreeling of the downrigger line is extremely time consuming and reduces the number of fish which can be caught.

Further, in previous release devices no simple mechanism has been developed for accurately determining and adjusting the amount of force required to release the fishing line when a fish strikes.

Accordingly, the need was apparent for a downrigger release mechanism which was small and simply designed, would, at predetermined selected tensions, reliably release the tackle line from the downrigger line each time a fish struck, had few moving parts, was not susceptible to corrosion, and could be mounted on a downrigger line such that the tackle line could be let down to a certain depth without reeling in and unreeling the downrigger line every time a strike occurred.

SUMMARY OF THE INVENTION

Accordingly, it is an object and feature of the present invention to provide a downrigger release which is small and simply designed, has few moving parts, and will reliably release a fishing tackle line each time a fish strikes a hook or lure attached to the tackle line.

It is another object and feature of the present invention to provide a downrigger release which may be alternately fixedly attached to the downrigger line or slidably mounted on the downrigger line such that additional releases may be slidably mounted on the downrigger line in order to carry the releasably attached fishing tackle line to the proper depth without reeling in and unreeling the downrigger line each time the tackle line is released from the downrigger release.

It is a further object and feature of the present invention to provide a downrigger release which will release the tackle line at any angle and which has a choice of release forces available to the fishermen depending on the size of the fish attempted to be caught.

It is a further object and feature of the present invention to provide a downrigger release having various release clip means for releasably securing the tackle line to the downrigger release.

These and other objects and features of the present invention may be accomplished by providing a downrigger release mechanism which releasably secures a fishing tackle line to a separate downrigger line. The downrigger release mechanism basically is a unitary body or release member which includes at least one annular groove formed integrally therein for the direct mounting of a removable release clip means. Two types of removable release clip means may be used with the release member. One of the clip means is secured to the tackle line and is pulled from the release member by a striking fish thereby releasing the tackle line. The second clip means is mounted so as to remain on the release member when a fish strikes, but includes integral means for releasing the tackle line so that the fish may be fought and landed.

The release member is mounted on a downrigger or outrigger line by securing means such as rings, clips or integrally formed holes in said member. Using the rings, one variation of the invention may be fixedly secured in the downrigger line such that a lowering of the downrigger line will position the release member at a predetermined depth. Using the clips or integrally formed holes, a second variation may be slidably mounted on the downrigger line such that the depth of the release mechanism, and tackle line releasably attached thereto, are controlled by the quantity of tackle line played out.

These and other objects, advantages and features of the invention will become apparent from a study of the following description taken in conjunction with the drawings.

DESCRIPTION OF THE PREFERRED EMBODIMENTS

Figure 1:
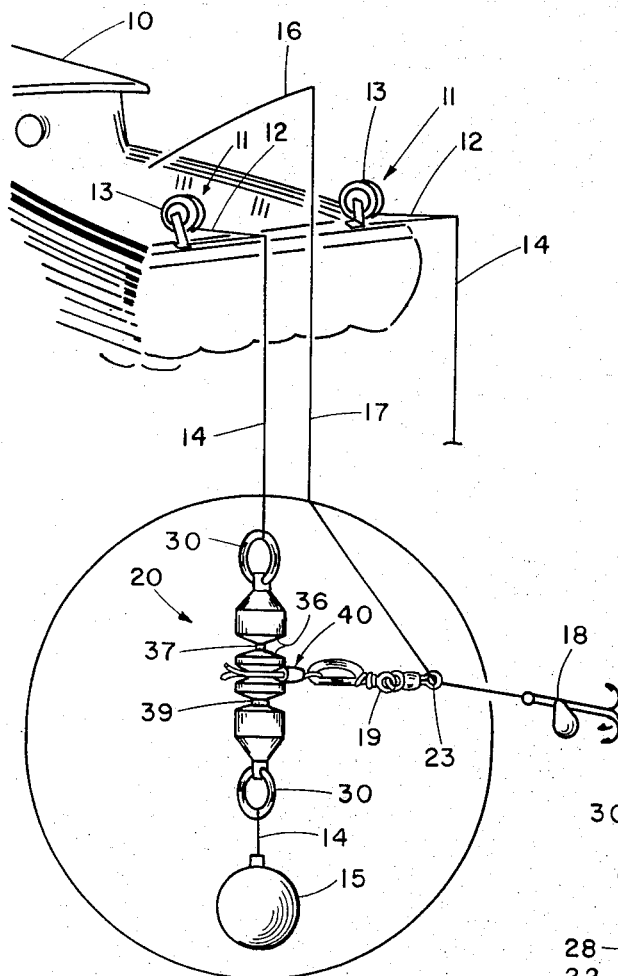
FIG. 1 is a perspective view of one embodiment of the present invention in its operative position shown in conjunction with a boat, the downrigger line and downrigger mechanism, and standard fishing tackle.

Referring now to the drawings in greater detail, FIG. 1 discloses a boat or fishing vessel 10 having the downrigger mechanisms 11 mounted thereon each of which include the conventional reel 13 to which is secured the downrigger line 14. The downrigger line 14 is wound on reel 13 and extends downwardly into the water and has secured thereto a ballast or weight 15 of the cannonball type. The release mechanism 20 of this invention is secured to line 14 intermediate the weight or ballast 15 and the boat 10 preferably near the weight 15 as desired by the fisherman.

A fishing pole 16 and standard fishing tackle line 17 reelably mounted thereon are used in conjunction with the downrigger 12 and downrigger line 14. Briefly, this is accomplished by securing the fishing line 17 to the release mechanism 20 at a predetermined depth. As will be explained hereinafter, when a fish strikes, the line is released from that portion of the release mechanism which is secured to the downrigger line 14 permitting the fisherman to reel in and fight the fish without any weight on the fishing line.

It should be understood that the various embodiments of this invention, relating to the release mechanism which will now be described, are generally utilized in conjunction with the downrigger mechanism and fishing tackle as above described, there being variations which will become apparent from the following descriptions.

Figure 2:
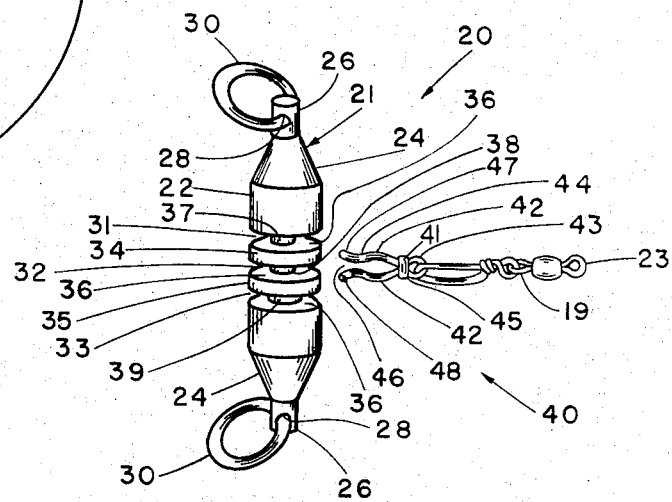
FIG. 2 is a perspective view of the embodiment of the invention shown in FIG. 1 depicting one type of release member in combination with one type of the removable release clip means.

FIG. 2 shows the first embodiment of the invention comprising the release mechanism 20 which is also disclosed in FIG. 1. In this embodiment one type of release or body member 21 is shown in combination with a first type of removable release clip means or spring clip 40 directly mountable on the release member 21. The release member 21 basically comprises a unitary body or cylinder 22 having sloped shoulders 24 at either end, which shoulders 24 taper to small coaxial cylindrical ends 26. The coaxial cylindrical ends 26 provide a mounting means for the securing means or pivotal rings 30 which extend through apertures 28 bored through the ends 26 perpendicular to the axis of those cylindrical ends. As shown in FIG. 1, the downrigger line is fixedly secured to the rings 30 thereby positioning release member 21 at a certain depth when the downrigger line is lowered into the water.

Figure 7:
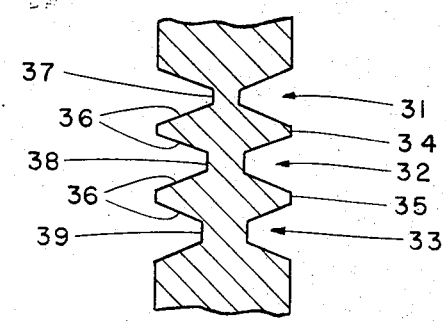
FIG. 7 is a cross-sectional view of the release portion of the release member shown in FIGS. 1, 2 and 3.

The cylindrical member 21 also includes release means comprising an area on which the removable clip means or spring clip 40 may be directly mounted. As shown in FIGS. 1, 2 and 7, the release means on member 21 comprises three annular grooves 31, 32 and 33 formed intermediate the ends of the member 21 and adjacent one another. These annular grooves 31, 32 and 33 are separated by flanges 34 and 35 and include beveled side walls 36 which slope or diverge away from central cylindrical cores 37, 38 and 39. Each of these central cores has a diameter different in size from that of the remaining cores such that the clip means 40 may be selectively clipped to the different diameter cores thereby providing a choice of release forces of the clip means 40 from the member 21. The beveled or sloped sides 36 greatly reduce the binding of the clip means 40 on the sides 36 and allow the release of the clip means 40 from the member 21 regardless of the angle at which the fish strikes the tackle line.

As stated above, the member 21 is a one-piece unitary cylinder or body 22 having grooves 31, 32 and 33 milled or formed therein. The member 21 may be manufactured from brass and covered with a corrosion-proof chrome plating. Similarly, other corrosion-proof materials such as stainless steel may also be used to manufacture the ballast. Member 21 may also be manufactured from plastics or other lightweight corrosion-proof materials since, as used in the first embodiment of the invention, weights 15 provide the ballast to sink it to the desired depth. Thus, the member 21 may be repeatedly used in salt or fresh water without damage due to its corrosion-proof construction.

As shown in FIGS. 1 and 2, the first type of removable release clip means 40 comprises a flared clip formed from a length of spring wire folded upon itself with a circularly bulged-out center section 42, a closed-loop end 43 for the attachment of the standard tackle line 17 and/or the snap swivel or leader line 19, and an open end 46 for removably mounting the clip means on the central cores 37, 38 and 39 of the member 21. The spring wires are necked towards each other between the center bulged-out section 42 and the closed end 43 at region 45 and between the center bulged-out section 42 and open end 46 at region 44. A collar 41 is placed around region 45 in order to provide a means for preventing clip 40 from separating from snap swivel 19. The open end 46 has the spring wire ends 47 and 48 flared outwardly from the necked region 44 such that the wire ends will separate when a force or object such as a central core 37, 38 or 39 is forced or applied between the flared ends 47 and 48. Thus, the central cores will be snapped into the center bulged-out section 42 and the spring wire will resist the release of the tackle line 17 by the strinking fish with a force dependent on the size of the central core to which the clip is snapped.

In the operation of the first embodiment, shown in FIGS. 1 and 2, the reel 13 of the downrigger mechanism 11 is wound up to position the weight 15 at the surface of the water thereby locating the release mechanism 20 also at the surface where the fisherman strings his fishing line through the eye 23 of the snap swivel or leader 19.

A removable release clip means or flared clip 40 is fixedly secured to the standard tackle line 17 by means of the snap swivel 19 and the removable clip means 40 is then snapped onto one of the central cores 37, 38 or 39 formed in the member 21. A trolling lure or hook 18 is also secured to the end of tackle line 17 by means of another snap swivel or other conventional means. Thus, in the arrangement shown in FIG. 1, when the above devices have been suitably mounted on the downrigger and tackle lines, the devices are dropped into the water and will sink to a depth controlled by the amount of downrigger line 14 released from the downrigger 12. The cannonball or other type weight 15 will maintain the devices at the desired depth for trolling until a fish strikes the trolling lure or hook 18. If the fish strikes with sufficient force, the flared clip 40 will be snapped or pulled from the central core 38 and the fish may then be reeled in by means of the standard tackle line 17. Since the line 17 is slidably passed through eye 23 of snap swivel 19, when a striking fish pulls flared clip 40 from member 21 the clip and snap swivel will slide down line 17 to the position of lure or hook 18, thereby allowing line 17 to be reeled in with a fish without the hinderance of clip 40 or snap swivel 19 being tied somewhere along the length of line 17. Alternatively, the clip 40 or swivel 19 may be tied into line 17 a few feet from hook or lure 18 so as not to impede the reeling of line 17 until the fish is at the water surface and may be landed with a net.

Figure 3:
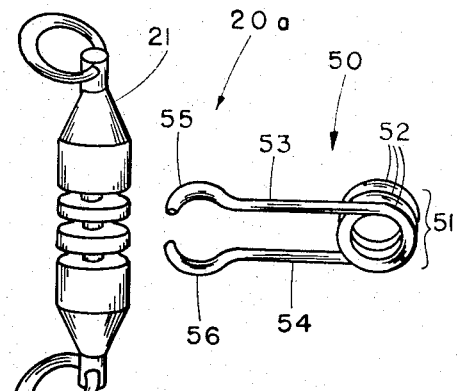
FIG. 3 is a perspective view of a second embodiment of the invention showing the release member shown in FIG. 1 in combination with a second type of the removable release clip means.

Referring now to FIG. 3, there is shown a second embodiment of the invention wherein the release mechanism 20a comprises a release member 21 used in conjunction with a second type of the removable release clip means 50. As shown therein, the clip means 50 comprises a coil clip formed from a spring wire coil cylinder 51 including a plurality of continuous single coils 52 immediately adjacent and coaxial with each other. The ends of the spring wire 53 and 54 extend tangentially away from the coil cylinder 51 parallel to one another in the same direction from the opposite ends of the coil cylinder 51. The wire ends 53 and 54 have paritally circular sections 55 and 56 formed therein which sections open toward one another and are coaxial but vertically spaced apart such that the sections can be fitted about two of the central cores, preferably cores 37 and 39, thereby removably supporting the coil clip 50 normally to the axis of the release member 21. The standard fishing tackle line 17 may be inserted between the coils 52 and held therebetween until a fish strikes. The coil clip 50 does not release from the member 21 when the fish strikes, but remains clipped to the member 21 allowing the tackle line 17 to be released from between the coils 52. Both the flared clip 40, described above, the coil clip 50 may be manufactured from heavy gauge brass wire which is annealed to provide the spring memory for the respective clip means. Other corrosion-proof materials such as stainless steel spring wire may also be used to manufacture the respective clip means. Thus, as with member 21, the clip means 40 and 50 are manufactured from corrosion-proof materials.

As described previously with release mechanism 20, release mechanism 20a may be tied or fixedly secured to downrigger line 14 so as to be positioned at a predetermined depth in the water. However, since mechanism 20a uses clip means 50, the tackle line 17 is releasably held between the coils 52 of clip means 50. Since coils 52 securely grip line 17 and prevent the line from sliding therethrough the line 17 must be positioned by the fisherman, when preparing the mechanism at the surface, such that the hook or lure will trail a certain distance behind member 21 and coils 52. When a fish strikes, the force of the strike pulls the line 17 from coils 52 while clip means 50 remains secured to member 21. Thus, line 17 may be reeled in with a fish without being impeded by any clip means which remains attached to the line.

Figure 4:
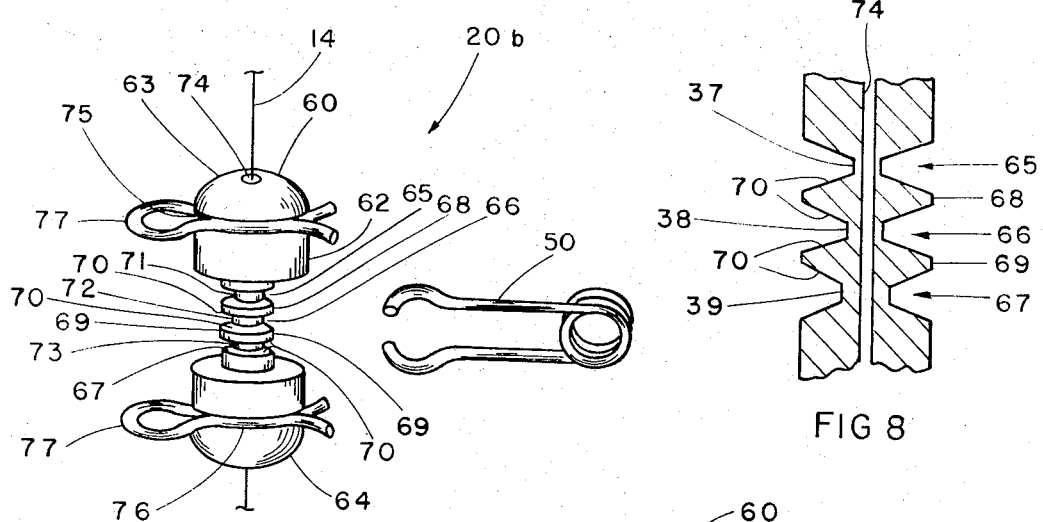
FIG. 4 is a perspective view of a third embodiment of the invention revealing a second type of release member in combination with the embodiment of the clip means shown in FIG. 3, and the downrigger line.
Figure 8:
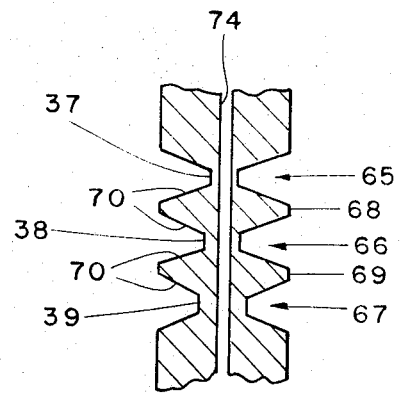
FIG. 8 is a cross-sectional view of the release protion of the release member shown in FIGS. 4, 5 and 6.

Referring now to FIGS. 4 and 8, a third embodiment of the present invention is depicted comprising a release mechanism 20b. As shown therein, a release or body member 60 comprises a unitary body or cylinder 62 having rounded ends 63 and 64. Like the first type of release or body member 21, the second release member 60 includes three annular grooves 65, 66 and 67 formed intermediate the ends 63 and 64 of cylinder 62 and adjacent one another. The grooves 65, 66 and 67 are separated by flanges 68 and 69. The sides 70 of the grooves are beveled or sloped such that they diverge away from cylindrical central cores 71, 72 and 73. Each of the cylindrical cores 71, 72 and 73 may be formed with different diameters from those of the remaining cores, as shown in FIG. 8, such that the clip means 40 may be selectively clipped to the different diameter cores thereby providing a choice of release forces for the clip means 40 from the member 60. It will be apparent that due to the spring action of the clip means 40, the clip means 40 will be more easily released from a smaller diameter core, i.e., core 71 or 72, than a larger diameter core, i.e., core 73.

The release member 60 also includes a hole 74 bored centrally through cylinder 62 along the axis thereof as shown in FIG. 8. The ends 63 and 64 of the cylinder 62 also include additional annular mounting grooves 75 and 76, each of the additional annular mounting grooves receiving a mounting clip means or downrigger line engaging spring clip 77. The spring clips 77 are exactly similar to the clip means 40 except for the fact that the spring clip 77 are formed larger than clip means 40 in order to accommodate the larger diameter of the cylinder ends 63 and 64.

Like the member 21, ballast 60 may be formed from corrosion-proof materials such as brass coated with a chrome plating or stainless steel thereby allowing the repeated use of the member 60 in either fresh or salt water. Similarly, the downrigger line engaging spring clip 77 may be formed from heavy gauge annealed brass or stainless steel spring wire such that spring clip 77 are also corrosion-proof.

Figure 5:
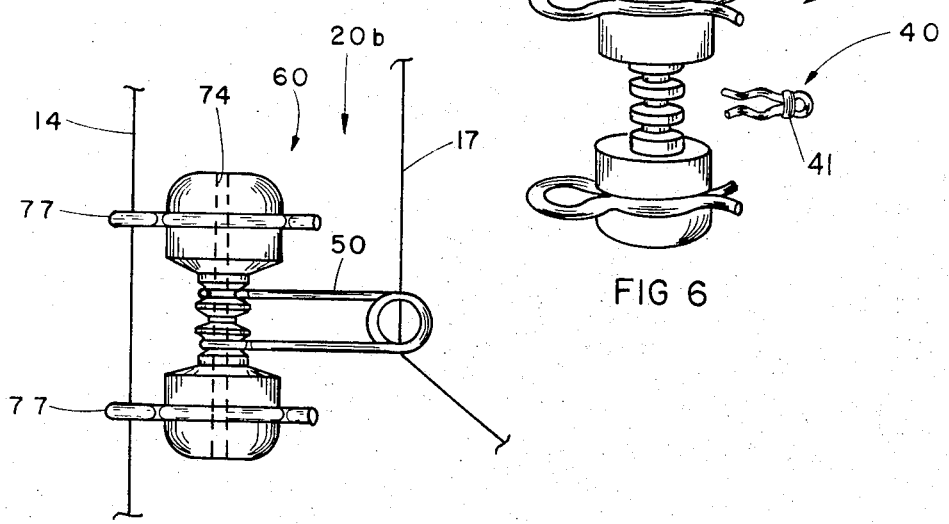
FIG. 5 is a side elevation of a slight modification of the embodiment of the invention shown in FIG. 4, shown in conjunction with both the downrigger line and the standard fishing tackle line.

As shown in FIGS. 4 and 5, the third embodiment of the invention or release mechanism 20b including release member 60 may be freely slidably mounted on the downrigger line 14 by means of axial hole 74 as in FIG. 4 or by means of spring clips 77 as in FIG. 5. The position of member 60 on the downrigger line, i.e., its depth in the water, is thereby controlled by the amount of tackle line 17 played out or released from the fishing pole 16 and releasably attached to the second type of the clip means 50. This is accomplished by slidably mounting member 60 on line 14 by means of hole 74 or clips 77, clipping tackle line 17 to clip means 50, and unreeling line 17 until member 60 sinks to the desired depth. Member 60 serves as a self-contained ballast which is heavy enough to sink without additional weights being attached thereto. Thus, several of the release members 60 may be freely slidably mounted on the downrigger line 14 without reeling in the downrigger line which is positioned in the water at a desired depth by means of additional cannonball or other type weights fixedly attached to the end of the downrigger line 14. Similarly, two or more members 60 may be used with one downrigger line thereby allowing several releasably attached tackle lines 17 to be fished at various depths. Accordingly, the first release member 60 will normally be slidably mounted by passing downrigger line 14 through hole 74. A tackle line 17 is then releasably secured to clip means 50 which is in turn mounted on member 60 and the entire mechanism 20b is lowered to the desired depth in the water by playing out tackle line 17. When the tackle line 17 is released from clip means 50 by the striking fish, a second release member 60 may be freely slidably mounted on the downrigger line by means of the spring clips 77 as shown in FIG. 5. Thus, additional member 60 may be added to the downrigger line 14 by clipping the line 14 between the mbember 60 and spring clip 77 and then releasing the additional member 60 to slide down the downrigger line to the desired depth by means of a tackle line 17 played out or released from pole 16. Alternatively, the additional members 60 and the additional tackle lines 17 may be positioned on downrigger lines 14 at various depths at the same time. Consequently, as described above, several fish may be caught by adding several members 60 to the downrigger line, either simultaneously at various depths or consecutively after each fish is caught in the above-described manner, without reeling in the downrigger line 14 to add each additional member 60 and mechanism 20b.

Alternatively, as described above with release member 21, the release member 60 may be fixedly attached to the downrigger line 14 by tying the downrigger line to the clips 77 or knotting the downrigger line 14 at either end 63 and 64 of hole 74 or member 60.

Figure 6:
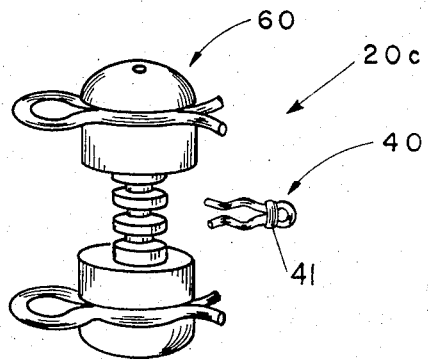
FIG. 6 is a perspective view of a fourth embodiment of the invention showing the release member shown in FIGS. 4 and 5 in combination with the type of the release clip means shown in FIGS. 1 and 2.

As shown in FIG. 6, a fourth embodiment of the present invention comprising release mechanism 20c includes release member 60 as it may be utilized with the first type of the clip means 40. Thus, as described in connection with the first embodiment of the invention or release mechanism 20, clip means 40 may be clipped or snapped to any one of the different diameter central cores 71, 72 or 73 to releasably attach the standard tackle line 17 to the member 60, thereby providing a choice of release pressures.

Therefore, the present novel invention provides an extremely adaptable release mechanism which is simply designed, corrosion-proof, will reliably release a standard tackle line when a fish strikes, and which may be alternately fixedly attached to the downrigger line or slidably mounted on the downrigger line such that additional release mechanisms may be mounted on the downrigger line to allow the catching of many fish without reeling in the downwrigger line which has been positioned at a desired depth.

While several forms of the invention have been shown and described, other forms will now be apparent to those skilled in the art. Therefore, it will be understood that the embodiments shown in the drawings and described above are merely for illustrative purposes and are not intended to limit the scope of the invention which is defined by the claims which follow.

The embodiments of the invention in which an exclusive property or privilege is claimed are defined as follows.

1. A downrigger release mechanism for releasably securing a fishing tackle to a separate downrigger line, said mechanism comprising at least one release member, said member including securing means for slidably mounting said member on said downrigger line and release means for releasably securing said tackle line to said member, said member having sufficient weight such that said member is adapted to slide along said downrigger line and carry said releasably secured tackle line to a desired position on said downrigger line when said downrigger line is placed in the water to be fished.

2. A downrigger release mechanism in accordance with claim 1 wherein said securing means include means for slidably securing said release member to a downrigger line without substantially altering the position of the line in the water.

3. A downrigger release mechanism in accordance with claim 2 wherein said release member is a unitary body, said body including at least one mounting clip means for securing said body to said downrigger line.

4. A downrigger release mechanism in accordance with claim 3 wherein said mounting clip means comprises at least on spring clip removably mounted in an annular mounting groove formed integrally in said body.

5. A downrigger release device in accordance with claim 1 wherein said securing means includes means for freely slidably mounting said release member on said downrigger line.

6. A downrigger release mechanism in accordance with claim 1 wherein said release means includes at least one groove formed integrally in said release member.

7. A downrigger release mechanism in accordance with claim 1 wherein said release means includes at least one groove on the outer surface of said member, said groove extending from a core and having sides diverging as they extend from said core.

8. A downrigger release mechanism in accordance with claim 1 wherein said release member comprise a unitary body and said securing means comprise a hole extending therethrough such that said downrigger line may be slidably passed therethrough.

9. A downrigger release mechanism in accordance with claim 8 wherein said release means includes at least one groove formed integrally in said release member.

10. A downrigger release mechanism in accordance with claim 1 wherein said release means includes a plurality of spaced grooves formed integrally therein; each of said grooves including a cylindrical core, each of said cores having a different sized diameter; said release means further including release clip means selectively releasably mounted on one of said cores such that a choice of holding forces of said clip means on said cores is available, said holding forces being primarily dependent on the diameter of said core.

11. A downrigger release mechanism in accordance with claim 8 wherein said release means includes a plurality of spaced grooves formed therein, each of said grooves including a cylindrical core, each of said cores having a different sized diameter; said release means further including release clip means selectively releasably mounted on one of said cores such that a choice of holding forces of said clip on said cores is available, said holding forces being primarily dependent on the diameter of said core.

12. A downrigger release mechanism in accordance with claim 1 wherein said release means include removable release clip means directly mounted on said member.

13. A downrigger release mechanism in accordance with claim 12 wherein said removable release clip means are mounted in at least one groove formed integrally in said member; said clip means including means for releasably securing said clip means in said groove such that said clip means releases from said member when a fish strikes said tackle line, and means for securing a tackle line directly to said clip whereby said tackle line remains secured thereto even after said clip means is released from said member.

14. A downrigger release mechanism in accordance with claim 12 wherein said clip means are mounted in at least one groove formed in said member and include means for releasably securing said tackle line to said release means and means for retaining said clip means on said member when a fish strikes, said clip means being mounted in said groove such that when a fish strikes and tackle line said clip means remains mounted on said member while said tackle line is released from said clip means.

15. A downrigger release mechanism in accordance with claim 14 wherein said release clip means comprises a coil clip formed from a spring wire coil cylinder, said coil cylinder including a plurality of continuous single coils immediately adjacent and coaxial with each other, the ends of said spring wire forming said coils extending tangentially away from said coil cylinder parallel to one another in the same direction from opposite ends of said coil cylinder, said wire ends having partially-circular sections formed therein, said sections opening toward one another and being coaxial such that said sections can be fitted about said two cores thereby removably supporting said clip means normally to the axis of said cylinder, said coil cylinder allowing the releasable engagement of said tackle line between said continuous single coils.

16. A downrigger release mechanism for releasably securing a fishing tackle line to a separate downrigger line, said mechanism comprising in combination
   a unitary release member having release means formed integrally therewith and securing means for mounting said member on said downrigger line, said release means on the outer surface of said member including at least one groove extending from a core and having sides diverging as they extend from said core;
   and a removable release clip means directly secured to said member in said groove and having means for securing said tackle line thereto.

17. A downrigger release mechanism in accordance with claim 16 wherein said release member includes a plurality of said grooves.

18. A downrigger release mechanism in accordance with claim 17 wherein each of said three grooves include a cylindrical core, each core having a different diameter, said release clip means being selectively releasably secured to one of said different diameter thereby providing a choice of release forces for said clip means, said forces being primarily dependent upon the diameter of said cores.

19. A downrigger release mechanism in accordance with claim 17 wherein said clip means includes a means for releasably securing said tackle line to said release clip means and means for retaining said clip means on said member when a fish strikes, said clip means being mounted in said groove such that when a fish strikes said tackle line said clip means remains mounted on said member while said tackle line is released from said clip means.

20. A downrigger release mechanism in accordance with claim 19 wherein said release clip means comprises a coil clip formed from a spring wire coil cylinder, said coil cylinder including a plurality of continuous single coils immediately adjacent and coaxial with each other, the ends of said spring wire forming said coils extending tangentially away from said coil cylinder parallel to one another in the same direction from opposite ends of said coil cylinder, said wire ends having partially-circular sections formed therein, said sections opening toward one another and being coaxial such that said sections can be fitted about said two cores thereby removably supporting said clip means normally to the axis of said cylinder, said coil cylinder allowing the releasable engagement of said tackle line between said continuous single coils.

* * * * *

PO-1050
(5/69)

UNITED STATES PATENT OFFICE
CERTIFICATE OF CORRECTION

Patent No. 3,778,918      Dated December 18, 1973

Inventor(s) John E. Emory, Sr. and John E. Emory, Jr.

It is certified that error appears in the above-identified patent and that said Letters Patent are hereby corrected as shown below:

Column 6, line 67;
    "mbember" should be --member--;

Column 8, line 4;
    "on" should be --one--;

Column 8, line 21;
    "comprise" should be --comprises--.

Signed and sealed this 14th day of May 1974.

(SEAL)
Attest:

EDWARD M.FLETCHER,JR.
Attesting Officer

C. MARSHALL DANN
Commissioner of Patents

UNITED STATES PATENT AND TRADEMARK OFFICE
CERTIFICATE OF CORRECTION

PATENT NO. : 3,778,918
DATED : December 18, 1973
INVENTOR(S) : John E. Emory, Sr.
John E. Emory, Jr.

It is certified that error appears in the above-identified patent and that said Letters Patent are hereby corrected as shown below:

Column 7, line 52;

After "line" insert --,--;

Column 7, line 56;

Delete "and carry" and insert therefor --, said mechanism being adapted to guide--.

Signed and Sealed this

Twenty-seventh Day of September 1977

[SEAL]

Attest:

RUTH C. MASON
Attesting Officer

LUTRELLE F. PARKER
Acting Commissioner of Patents and Trademarks